(12) United States Patent
Whitaker et al.

(10) Patent No.: US 8,892,351 B2
(45) Date of Patent: Nov. 18, 2014

(54) SYSTEM AND METHOD FOR OBTAINING, IN A VEHICLE, INFORMATION CONCERNING POINTS OF INTEREST

(75) Inventors: Matthew Whitaker, Canton, MI (US); Christopher Kurecka, Ann Arbor, MI (US); Emily Reyna, Ann Arbor, MI (US); Hari Srinivasan, Shanghai (CN)

(73) Assignee: Ford Motor Company, Dearborn, MI (US)

( * ) Notice: Subject to any disclaimer, the term of this patent is extended or adjusted under 35 U.S.C. 154(b) by 1877 days.

(21) Appl. No.: 11/737,998

(22) Filed: Apr. 20, 2007

(65) Prior Publication Data

US 2008/0262725 A1  Oct. 23, 2008

(51) Int. Cl.
*G01C 21/26* (2006.01)
*G01C 21/36* (2006.01)
*G08G 1/0968* (2006.01)
*G08G 1/0969* (2006.01)

(52) U.S. Cl.
CPC ...................... *G01C 21/26* (2013.01)
USPC ........... 701/408; 701/420; 701/426; 701/438; 701/517

(58) Field of Classification Search
CPC ........ H04W 12/02; H04W 8/16; G01C 21/20; G01C 21/26; G01C 21/34; G01C 21/3682; G01C 21/3679; G01C 21/00

USPC ........ 455/404.2, 411, 414.2, 421, 440, 456.1, 455/456.3, 456.4, 457; 701/208, 211, 215; 707/E17.018, E17.11

See application file for complete search history.

(56) References Cited

U.S. PATENT DOCUMENTS

| | | | |
|---|---|---|---|
| 5,608,635 A * | 3/1997 | Tamai | 701/209 |
| 5,712,899 A | 1/1998 | Pace, II | |
| 6,526,335 B1 | 2/2003 | Treyz et al. | |
| 2001/0055975 A1* | 12/2001 | McDonnell et al. | 455/456 |
| 2002/0077127 A1* | 6/2002 | Heckard et al. | 455/457 |
| 2003/0050755 A1* | 3/2003 | Sakata et al. | 701/210 |
| 2004/0148277 A1 | 7/2004 | Gray | |
| 2004/0260465 A1* | 12/2004 | Tu | 701/209 |
| 2005/0065711 A1 | 3/2005 | Dahlgren et al. | |
| 2006/0089788 A1 | 4/2006 | Laverty | |

FOREIGN PATENT DOCUMENTS

WO  2007115221 A2  10/2007

* cited by examiner

*Primary Examiner* — Khoi Tran
*Assistant Examiner* — Dale Moyer
(74) *Attorney, Agent, or Firm* — Jennifer M. Stec; Brooks Kushman P.C.

(57) ABSTRACT

To obtain point of interest information in a vicinity of a vehicle, the vehicle selects a reference point away from the current location of the vehicle. A region is formed, including the current location of the vehicle, based on the reference point. Points of interest falling within the region are communicated to the vehicle.

11 Claims, 6 Drawing Sheets

US 8,892,351 B2

SYSTEM AND METHOD FOR OBTAINING, IN A VEHICLE, INFORMATION CONCERNING POINTS OF INTEREST

BACKGROUND OF THE INVENTION

1. Field of the Invention

The invention relates to systems and methods for obtaining, in a vehicle, information concerning points of interest.

2. Discussion

A vehicle may communicate with a remote source to gather information requested by an occupant of the vehicle.

SUMMARY

Embodiments of the invention may take the form of a method for obtaining, in a vehicle, information concerning points of interest. The method includes determining vehicle geographic coordinates defining a current location of the vehicle, selecting reference geographic coordinates defining a reference point located a distance away from the current location of the vehicle, and determining region geographic coordinates defining a region, including the current location of the vehicle, based on the reference geographic coordinates. The method also includes requesting information regarding points of interest located within the region from a remote information provider, receiving information regarding points of interest located within the region from the remote information provider, and presenting information regarding the points of interest located within the region to the occupant of the vehicle.

Embodiments of the invention may take the form of a method for obtaining, in a vehicle, information concerning points of interest. The method includes determining vehicle geographic coordinates defining a current location of the vehicle and selecting reference geographic coordinates defining a reference point located a distance away from the current location of the vehicle. The method also includes requesting information regarding points of interest in the vicinity of the reference point from a remote information provider, receiving information regarding points of interest in the vicinity of the reference point from the remote information provider, and presenting information regarding the points of interest in the vicinity of the reference point to the occupant of the vehicle.

Embodiments of the invention may take the form of a system for obtaining, in a vehicle, information concerning points of interest. The system includes a location module for determining vehicle geographic coordinates defining a current location of the vehicle. The system also includes a processing module for selecting reference geographic coordinates defining a reference point located a distance away from the current location of the vehicle and determining region geographic coordinates defining a region including the current location of the vehicle based on the reference geographic coordinates. The system further includes a communication module for requesting information regarding points of interest located within the region from a remote information provider and receiving information regarding points of interest located within the region from the remote information provider. The system still further includes a display module for presenting information regarding the points of interest located within the region to an occupant of the vehicle.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

An occupant of a vehicle may request information from a remote vehicle source regarding restaurants, gas stations, etc., in the vicinity of the vehicle. In doing so, the vehicle may reveal its current location at the time of request. Certain occupants may have privacy concerns with respect to the current location of their vehicle.

Figure 1:
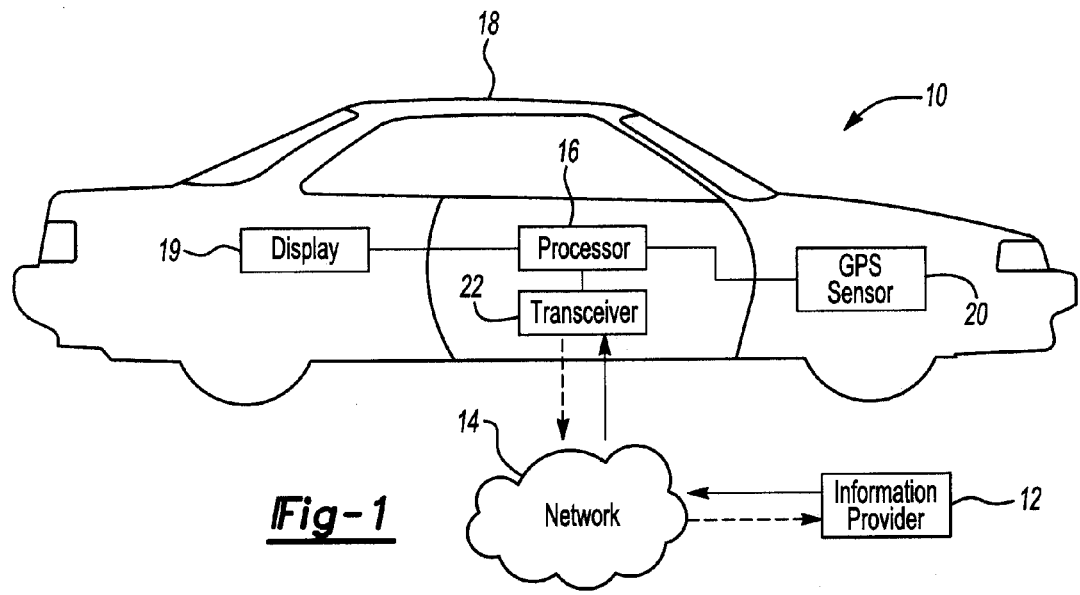
FIG. 1 is a block diagram of a vehicle system for requesting information from an off-vehicle information provider in accordance with an embodiment of the invention and shows the vehicle communicating with the information provider via a network.

FIG. 1 is a block diagram of a vehicle system 10 for requesting information from an off-vehicle information provider 12 via network 14. Processor 16 of vehicle 18 is electrically connected with display 19, GPS sensor 20, and transceiver 22. Processor 16 sends information to display 19 for display to occupants of vehicle 18. GPS sensor 20 senses the current geographic position of vehicle 18 and, together with processor 16, determines the global positioning system (GPS) coordinates for the current location of vehicle 18. Transceiver 22 communicates wirelessly with network 14 to send information to and receive information from information provider 12. As described below, transceiver 22 requests and receives information regarding locations of interest in a predefined area near vehicle 18 from information provider 12.

Figure 2:
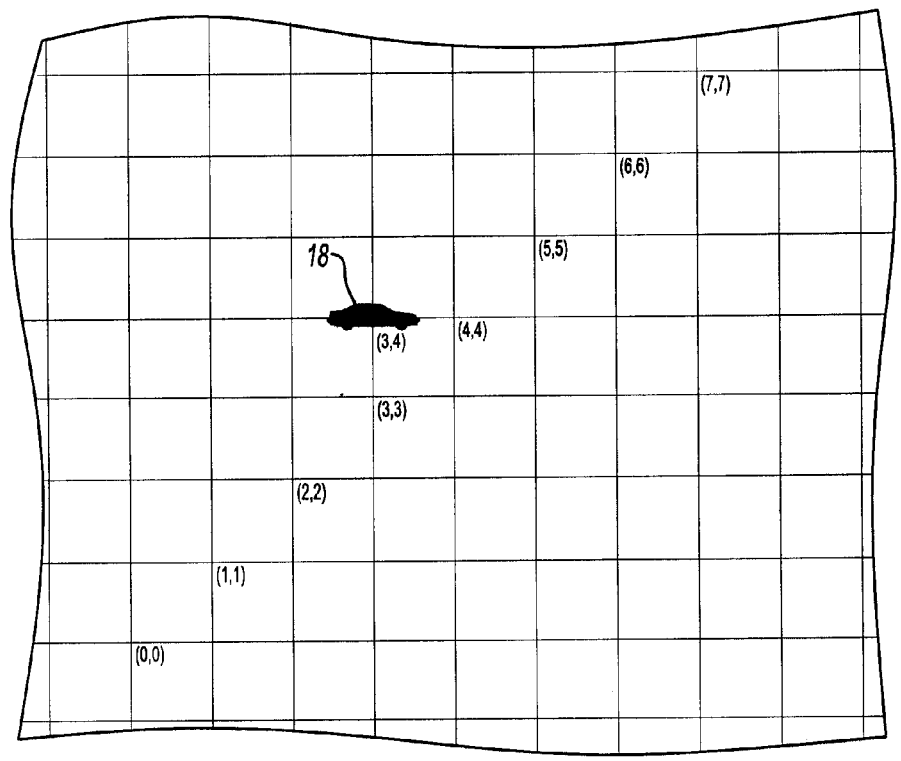
FIG. 2 is a schematic diagram of a geographic coordinate system projected onto the vehicle in accordance with an embodiment of the invention and shows the vehicle at location (3,4) relative to an arbitrary origin at (0,0).

FIG. 2 is a schematic diagram of a geographic coordinate system projected onto vehicle 18. Vehicle 18 is at location (3,4) relative to an arbitrary origin at (0,0). The grid pattern represents the latitude and longitude coordinates of various points on the surface of the earth. As described above, vehicle 18 is able to determine its actual location using onboard systems including GPS sensor 14. In some embodiments, GPS sensor 14 is mounted in vehicle 18. In other embodiments, GPS sensor 14 may be mounted within a cell phone (not shown) in communication with processor 16.

Processor 16 (FIG. 1) will select a point at random that is within a predefined proximity of vehicle 18. This point will lie at the center of an area of interest in which processor 16 via transceiver 22 will request information regarding locations of interest from information provider 12. In alternative embodiments, the point selected will not lie at the center of the area of interest.

Figure 3:
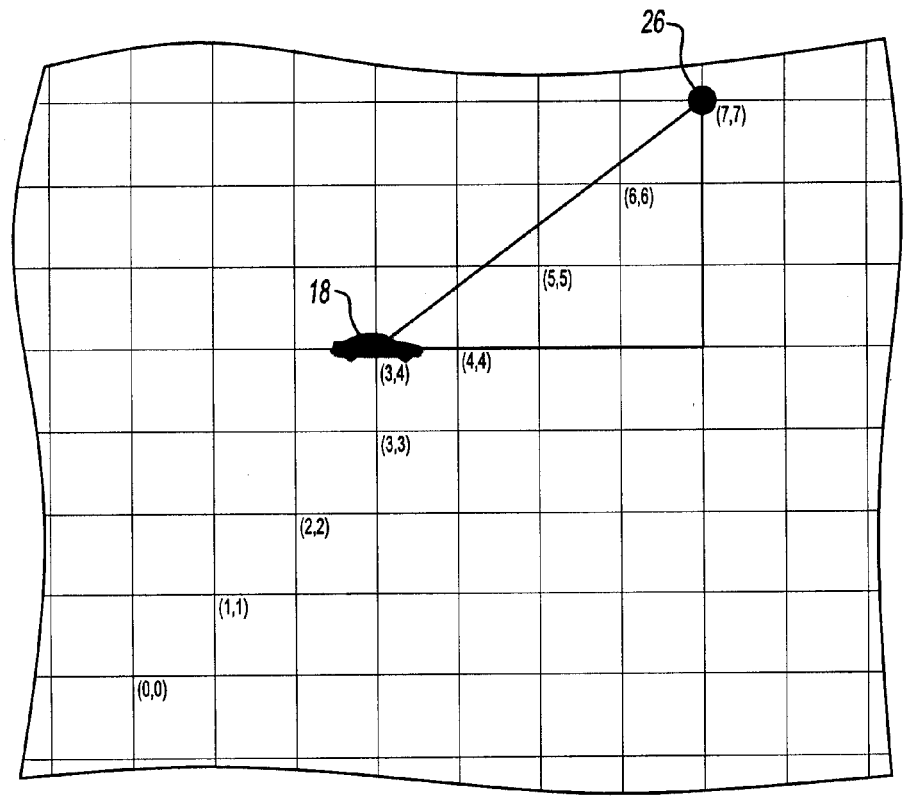
FIG. 3 is another schematic diagram of the geographic coordinate system of FIG. 2 and shows a center at location (7,7).

FIG. 3 is another schematic diagram of the geographic coordinate system of FIG. 2. Processor 16 selected center 26 at location (7,7). In the embodiment of FIG. 3, center point 26 was selected by taking the actual coordinates of vehicle 18 and adding (or subtracting) a randomized adjustment. In this case, the randomized adjustment was +4 units to the actual longitude coordinate of vehicle 18 and +3 units to the actual latitude coordinate of vehicle 18. As such, the distance between vehicle 18 and center location 26 is 5 units. In some embodiments, the randomized adjustment has a predefined limit, e.g., |10|. In alternative embodiments, center point 26 may be determined by processor 10 selecting a randomized distance, not exceeding a predefined limit, away from the current coordinates of vehicle 18, e.g., 5 units, at a randomized angle from its current direction, e.g., 0°.

Figure 4:
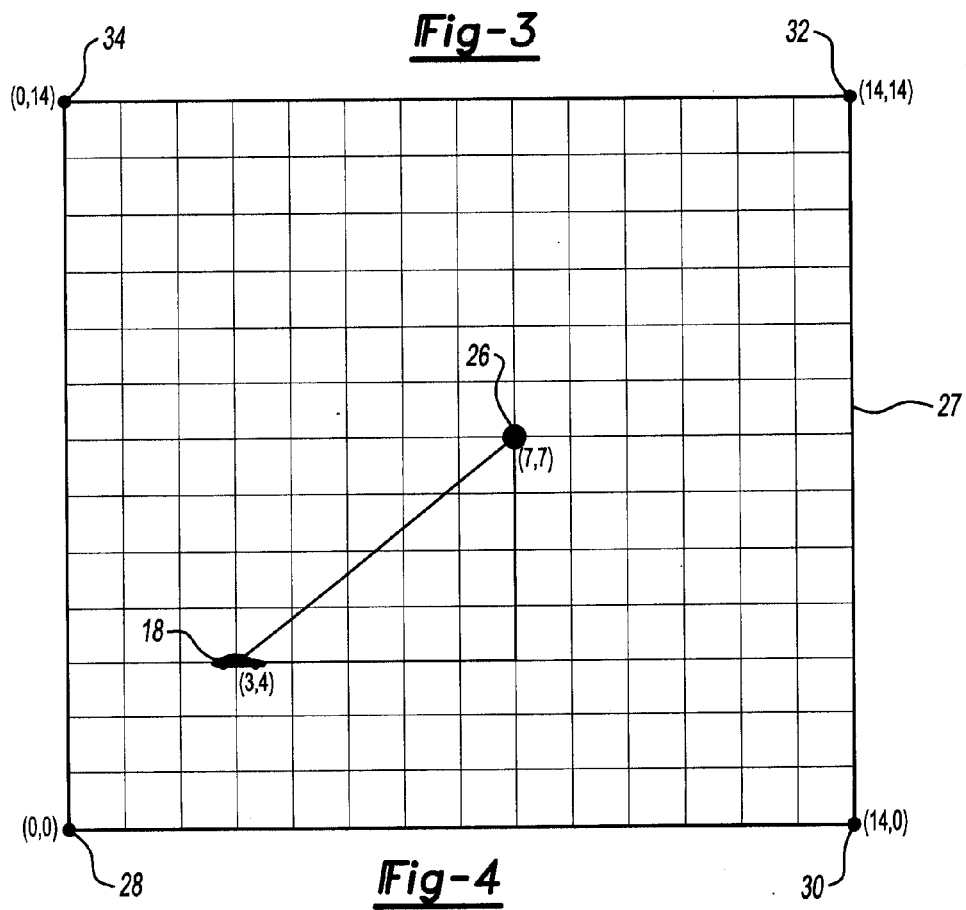
FIG. 4 is another schematic diagram of the geographic coordinate system of FIG. 2 and shows the boundaries of a square region having a center at location (7,7).

FIG. 4 is another schematic diagram of the geographic coordinate system of FIG. 2. Processor 16 used center 26 to generate geometric bounded shape 27, e.g., the area of interest. In the embodiment of FIG. 4, shape 27 is a square. In alternative embodiments, shape 27 may or may not be geometric. To generate the coordinates of corner locations 28, 30, 32, 34 of shape 27, a randomized distance, e.g., seven units, is added and subtracted to the coordinates of center location 26:

Minimum longitude=center location longitude−randomized selection.

Maximum longitude=center location longitude+randomized selection.

Minimum latitude=center location latitude−randomized selection.

Maximum latitude=center location latitude+randomized selection.

After processor 16 identifies boundary points 28, 30, 32, 34, it feeds that information to transceiver 22 which sends it, via network 14, to information provider 12. Information provider 12 uses points 28, 30, 32, 34 to determine locations of interest within shape 27. Because vehicle 18 does not transmit its actual coordinates and does not lie at center 26 of shape 27, the exact location of vehicle 18 cannot be tracked by information provider 18.

In alternative embodiments, vehicle 18 may transmit coordinates of center 26 to information provider 12 and information provider 12 may generate shape 27 as described above.

Figure 5:
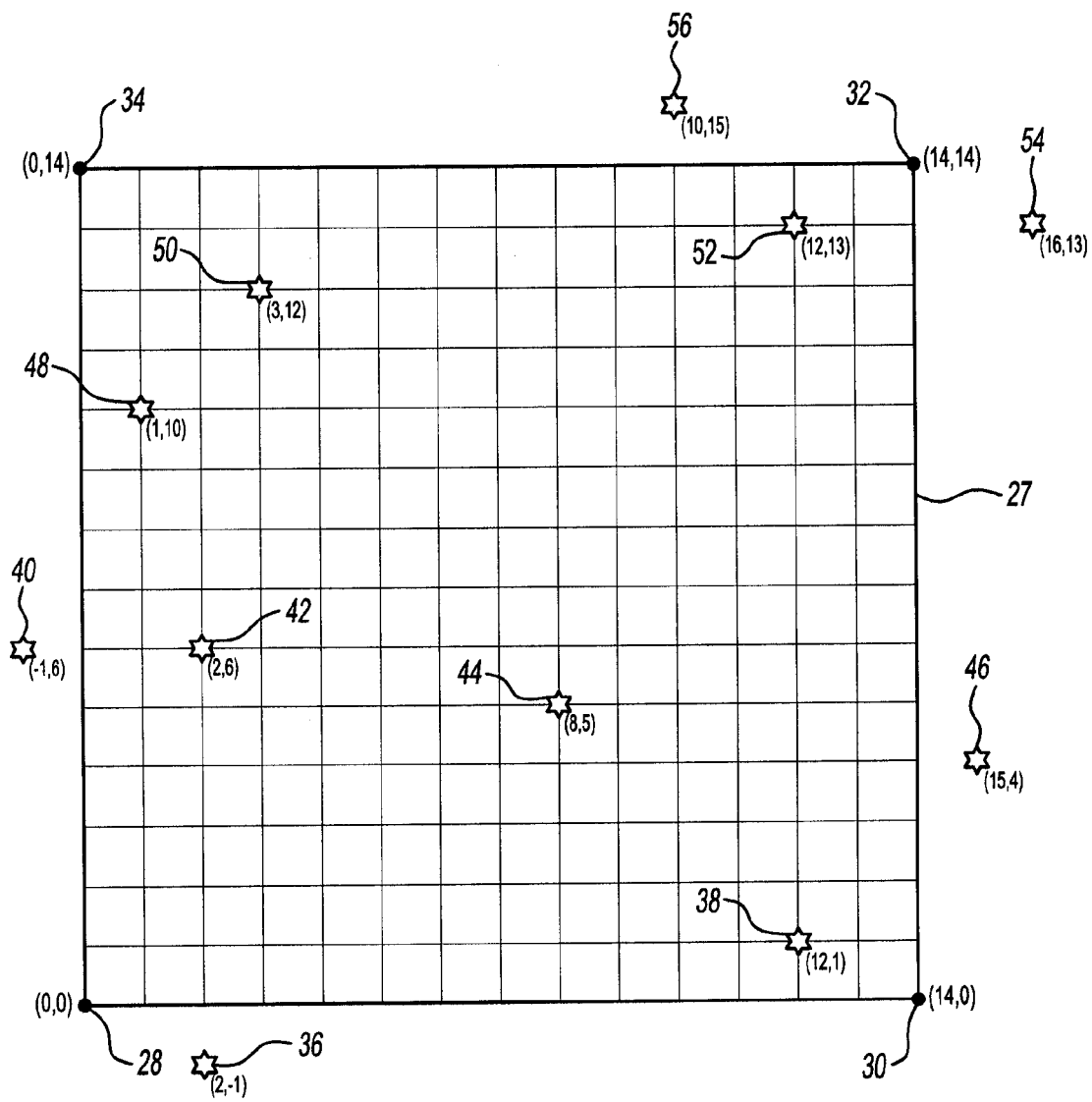
FIG. 5 is another schematic diagram of the geographic coordinate system of FIG. 2 and shows points of interest both inside and outside the region.

FIG. 5 is another schematic diagram of the geographic coordinate system of FIG. 2 showing locations of interest both inside and outside shape 27. Certain locations of interest 36, 40, 46, 54, 56 fall outside shape 27 and will not be communicated back to vehicle 18. Other locations of interest 38, 42, 44, 48, 50, 52 fall within shape 27 and will be communicated back to vehicle 18 via network 22.

Figure 6:
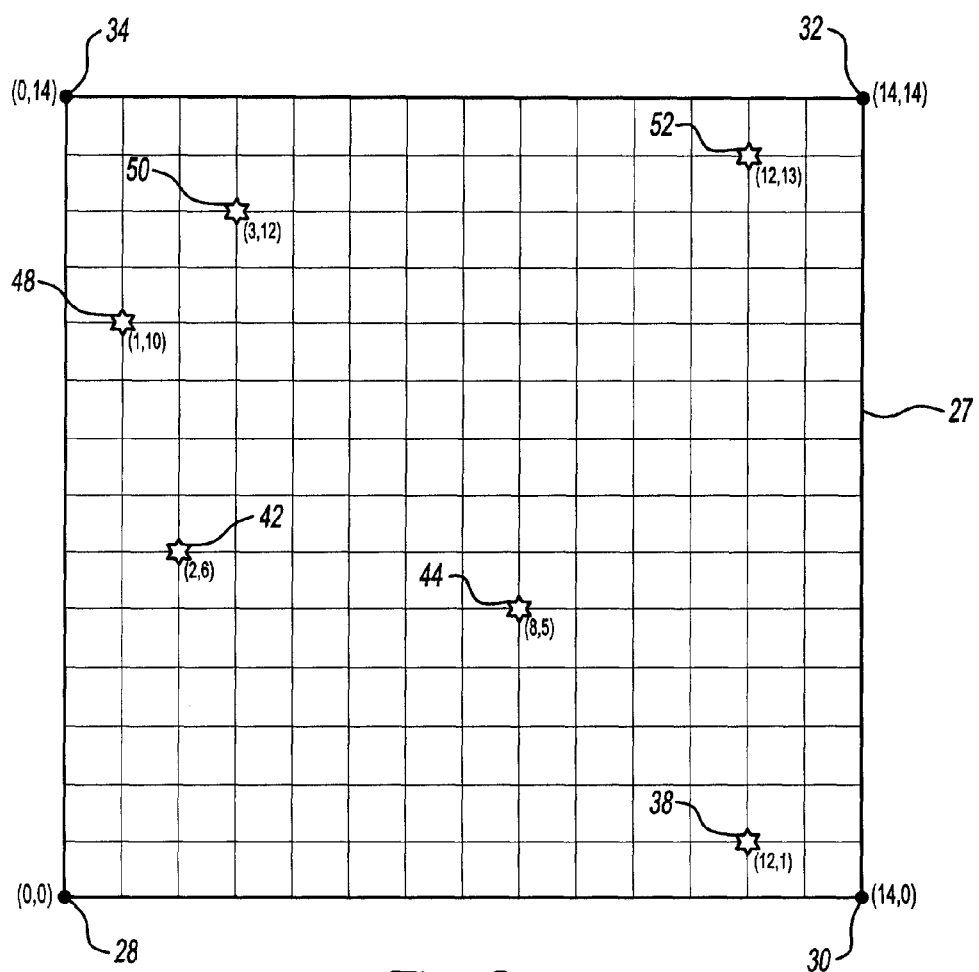
FIG. 6 is another schematic diagram of the geographic coordinate system of FIG. 2 and shows points of interest inside the region.

FIG. 6 is another schematic diagram of the geographic coordinate system of FIG. 2 showing locations of interest 38, 42, 44, 48, 50, 52 that information provider transmits to vehicle 18. Vehicle 18 may then display information regarding locations of interest 38, 42, 44, 48, 50, 52 via display 19.

Figure 7:
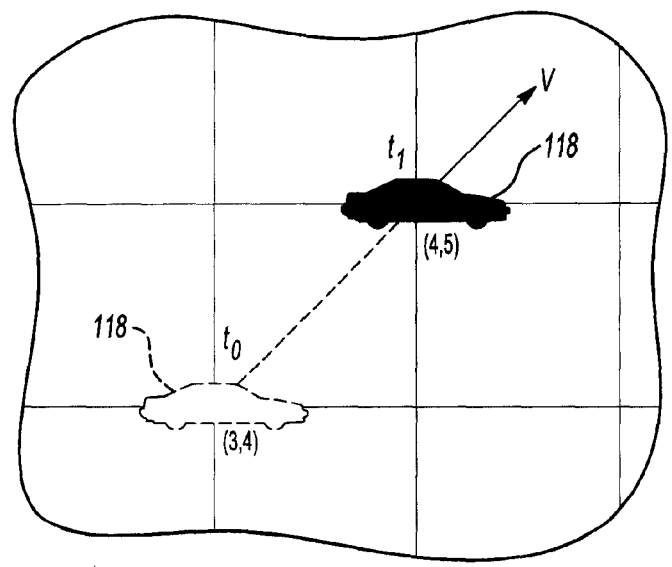
FIG. 7 is a schematic diagram of a geographic coordinate system projected onto a vehicle in accordance with an alternative embodiment of the invention and shows the vehicle at location (3,4) at time $t_0$ and having a direction of travel V at location (4,5) at time $t_1$.

FIG. 7 is a schematic diagram of a geographic coordinate system projected onto vehicle 118. Numbered elements differing by factors of 100 have similar descriptions, e.g., 18, 118 are both vehicles. At time $t_0$, vehicle 118 is at location (3,4). At time $t_1$, vehicle 118 is at location (4,5). Processor 116 (not shown), using conventional techniques, determines the direction of travel V of vehicle 118 based on this change in coordinate location over time, e.g., d(location)/d(time). Processor 116 uses this information to bias the random selection of center location 126 in the direction of travel V of vehicle 118, e.g., the angle between center location 126 and the direction of travel V relative to vehicle 118 may not exceed 85°.

Figure 8:
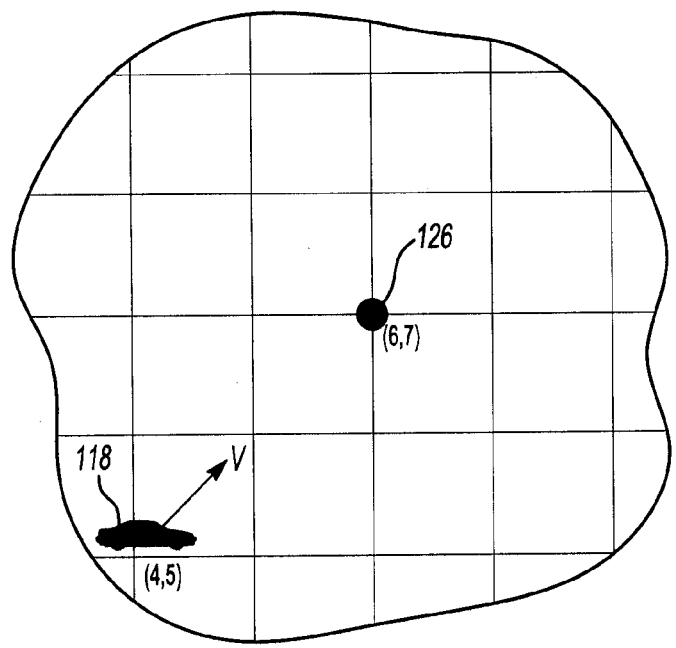
FIG. 8 is another schematic diagram of the geographic coordinate system of FIG. 7 and shows a center at location (6,7).

FIG. 8 is another schematic diagram of the geographic coordinate system of FIG. 7. Processor 116 selected center 126 at location (6,7). Center 126 lies along the direction of travel V of vehicle 118 when vehicle 118 is at location (4,5). In alternative embodiments, processor 116 may choose a random angle, e.g., 45°, as measured from the direction of travel V to select center 126.

Figure 9:
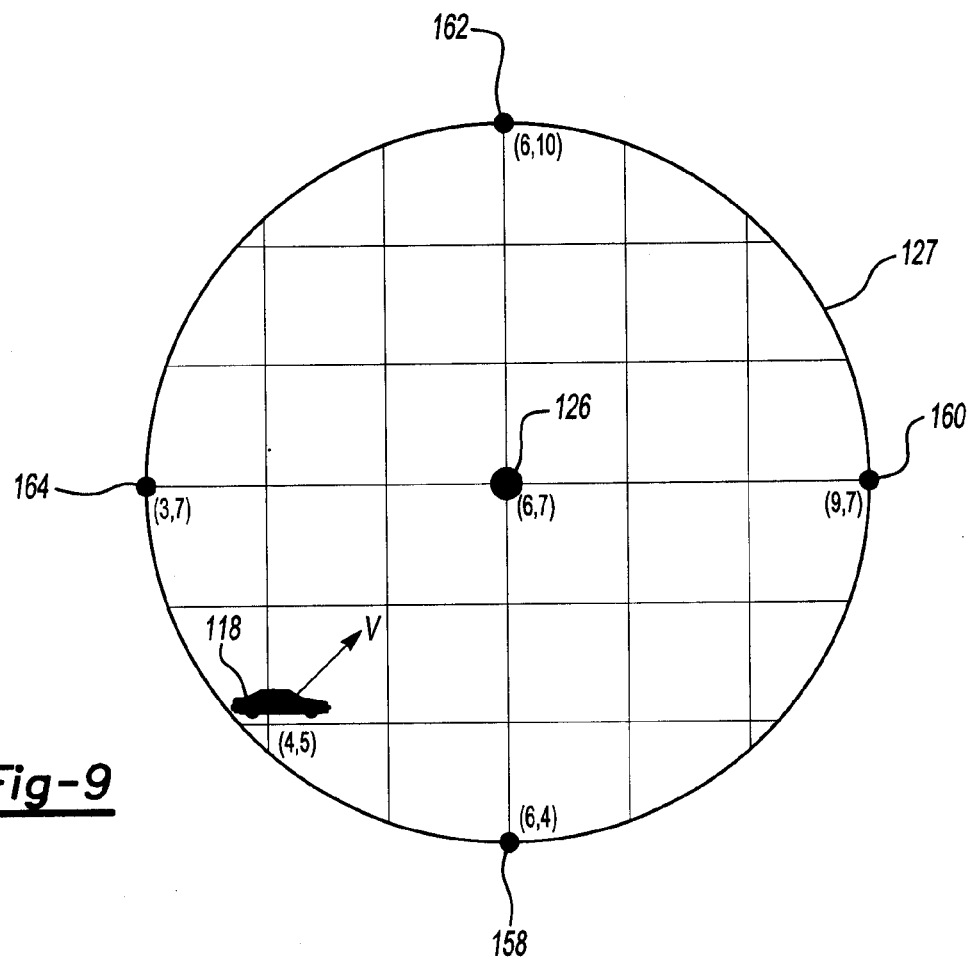
FIG. 9 is another schematic diagram of the geographic coordinate system of FIG. 7 and shows the boundaries of a circular region having a center at location (6,7).

FIG. 9 is another schematic diagram of the geographic coordinate system of FIG. 7. Shape 127 is a circle having a radius of three units from center 126. In embodiments where processor 116 (or information provider 112) uses such polar coordinates to generate the region of interest, the radius of shape 127 relative to center location 126 should be greater than the distance between vehicle 118 and center 126. Under such circumstances, the current location of vehicle 118 will fall within shape 127.

Figure 10:
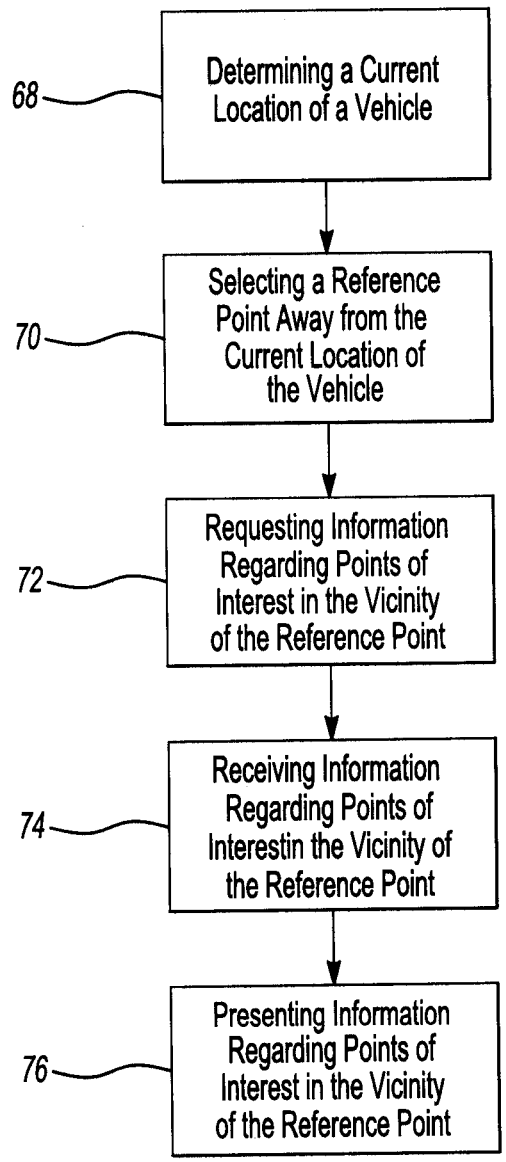
FIG. 10 is a flow chart of a method for obtaining, in a vehicle, information concerning locations of interest in accordance with an embodiment of the invention.

FIG. 10 is a flow chart of a method for obtaining, in a vehicle, information concerning locations of interest. At 68, a current location of the vehicle is determined. At 70, a reference point away from the current location of the vehicle is selected. At 72, information regarding points of interest in the vicinity of the reference point are requested. At 74, information regarding points of interest in the vicinity of the reference point is received. At 76, information regarding points of interest in the vicinity of the reference point is presented.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for obtaining, in a vehicle, information concerning points of interest, the method comprising:
by at least one processor,
determining vehicle geographic coordinates defining a current location of the vehicle;
selecting reference geographic coordinates defining a reference point located a randomly selected distance away from the current location of the vehicle;
calculating, from the reference geographic coordinates, region geographic coordinates defining at least a portion of a boundary of a region including the current location of the vehicle;
requesting information regarding points of interest located within the region from a remote information provider, the request including the region geographic coordinates;

receiving information regarding points of interest located within the region from the remote information provider; and presenting information regarding the points of interest located within the region to an occupant of the vehicle.

2. The method of claim 1 wherein the distance is less than a predefined limit.

3. The method of claim 1 wherein the region is a geometric region.

4. The method of claim 3 wherein the region is a square.

5. The method of claim 3 wherein the region is a circle.

6. The method of claim 1 further comprising determining a direction of travel of the vehicle and wherein the reference geographic coordinates are selected based on the direction of travel of the vehicle.

7. The method of claim 1 wherein the reference point is at the center of the region.

8. A system for obtaining, in a vehicle, information concerning points of interest, the system comprising:

a location module for determining vehicle geographic coordinates defining a current location of the vehicle;

a processing module for randomly selecting reference geographic coordinates within a predefined range defining a reference point located a distance away from the current location of the vehicle, and calculating, from the reference geographic coordinates, region geographic coordinates defining at least a portion of a boundary of a region including the current location of the vehicle, a communication module for requesting information regarding points of interest located within the region from a remote information provider, the request including the region geographic coordinates, and receiving information regarding points of interest located within the region from the remote information provider; and a display module for presenting information regarding the points of interest located within the region to an occupant of the vehicle.

9. The system of claim 8 wherein the distance is a predefined distance.

10. The system of claim 8 wherein the distance is less than a predefined limit.

11. The system of claim 8 wherein the processing module further determines a direction of travel of the vehicle and wherein the reference geographic coordinates are selected based on the direction of travel of the vehicle.

* * * * *